(12) United States Patent
Lee

(10) Patent No.: US 12,543,001 B2
(45) Date of Patent: Feb. 3, 2026

(54) SOUND SYSTEM AND METHOD FOR IMPLEMENTING SOUND STAGE THEREOF

(71) Applicants: Hyundai Motor Company, Seoul (KR); Kia Corporation, Seoul (KR)

(72) Inventor: Hyun Woo Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 455 days.

(21) Appl. No.: 18/200,912

(22) Filed: May 23, 2023

(65) Prior Publication Data
US 2024/0080619 A1 Mar. 7, 2024

(30) Foreign Application Priority Data
Sep. 1, 2022 (KR) .......................... 10-2022-0110927

(51) Int. Cl.
*H04R 3/14* (2006.01)
*G06F 3/16* (2006.01)
*H04R 29/00* (2006.01)

(52) U.S. Cl.
CPC .............. *H04R 3/14* (2013.01); *G06F 3/165* (2013.01); *H04R 29/002* (2013.01); *H04R 2499/13* (2013.01)

(58) Field of Classification Search
CPC .... H04R 3/14; H04R 29/002; H04R 2499/13; H04R 3/12; G06F 3/165
USPC .................................................. 381/302, 86
See application file for complete search history.

(56) References Cited

U.S. PATENT DOCUMENTS

| 10,235,122 | B1 * | 3/2019 | Goel ..................... G06F 3/1423 |
| 2021/0350708 | A1 * | 11/2021 | Kim ..................... G05D 1/0295 |
| 2022/0139229 | A1 * | 5/2022 | Hong ..................... G08G 1/22 |
| | | | 701/26 |

* cited by examiner

*Primary Examiner* — Vivian C Chin
*Assistant Examiner* — Douglas J Suthers
(74) *Attorney, Agent, or Firm* — Fox Rothschild LLP

(57) ABSTRACT

A sound system for implementing a sound stage through a connection between a sound source and vehicle sound systems and a method for implementing a sound stage thereof may include a source device that provides sound data and a first vehicle and at least one second vehicle connected with the source device through short range wireless communication. The first vehicle enters a sound stage mode, searches for the at least one second vehicle based on a predetermined sound stage type, specifies a speaker role of each of the at least one second vehicle, transmits the specified speaker role and source device connection information to the at least one second vehicle, and connects the first vehicle and the at least one second vehicle with the source device based on the specified speaker role and the source device connection information to implement a sound stage.

15 Claims, 14 Drawing Sheets

SOUND SYSTEM AND METHOD FOR IMPLEMENTING SOUND STAGE THEREOF

CROSS-REFERENCE TO RELATED APPLICATION

This application claims under 35 U.S.C. § 119(a) the benefit of priority to Korean Patent Application No. 10-2022-0110927, filed in the Korean Intellectual Property Office on Sep. 1, 2022, the entire contents of which are incorporated herein by reference.

TECHNICAL FIELD

The present disclosure relates to a sound system for implementing a sound stage through a connection between a sound source and vehicle sound systems and a method for implementing a sound stage thereof.

BACKGROUND

An audio source device may be connected with an audio playback device, such as an earphone, a speaker, or a headphone, through wireless communication. At this time, one audio source device may be connected with a maximum of two audio playback devices. The audio source device may transmit audio data to audio playback devices connected with the audio source device, and the audio playback devices may receive and play the audio data.

SUMMARY

The present disclosure has been made to solve the above-mentioned problems occurring in the existing technologies while advantages achieved by the existing technologies may be maintained intact.

An embodiment of the present disclosure provides a sound system for connecting a sound source with vehicle sound systems to implement a sound stage in an external space and a method for implementing a sound stage thereof.

The technical problems to be solved by the present disclosure may not be limited to the aforementioned problems, and any other technical problems not mentioned herein will be clearly understood from the following description by those skilled in the art to which the present disclosure pertains.

According to an embodiment of the present disclosure, a sound system may include a source device that provides sound data and a first vehicle and at least one second vehicle connected with the source device through short range wireless communication. The first vehicle may enter a sound stage mode, may search for the at least one second vehicle based on a predetermined sound stage type, may specify a speaker role of each of the at least one second vehicle, may transmit the specified speaker role and source device connection information to the at least one second vehicle, and may connect the first vehicle and the at least one second vehicle with the source device based on the specified speaker role and the source device connection information to implement a sound stage.

The short range wireless communication may be low energy (LE) audio.

The at least one second vehicle may enter the sound stage mode and may transmit predetermined role information and system configuration information to the first vehicle.

The first vehicle may transmit a position adjustment request to the at least one second vehicle and may wait until a response indicating that adjustment of a vehicle position may be completed may be received from the at least one second vehicle.

The at least one second vehicle may adjust a vehicle position with respect to the first vehicle and may transmit the response indicating that the adjustment of the vehicle position may be completed to the first vehicle.

The at least one second vehicle may adjust the vehicle position in a predetermined order.

The first vehicle and the at least one second vehicle may determine a communication protocol and a codec to be used for a connection with the source device and may specify an AMP output control parameter based on a previously specified speaker role.

The sound stage type may be classified into a surround sound stage, a stereo sound stage, and an individual sound stage.

According to another embodiment of the present disclosure, a method for implementing a sound stage of a sound system including a source device, a first vehicle, and at least one second vehicle connected using short range wireless communication may include entering, by the first vehicle and the at least one second vehicle, a sound stage mode, searching, by the first vehicle, for the at least one second vehicle based on a predetermined sound stage, specifying, by the first vehicle, a speaker role of each of the at least one second vehicle, transmitting, by the first vehicle, the specified speaker role and source device connection information to the at least one second vehicle, and being connected, by the first vehicle and the at least one second vehicle, with the source device based on the specified speaker role and the source device connection information to implement a sound stage.

The entering of the sound stage mode may include transmitting, by the at least one second vehicle, predetermined role information and system configuration information to the first vehicle.

The implementing of the sound stage may include transmitting, by the first vehicle, a position adjustment request to the at least one second vehicle, adjusting, by the at least one second vehicle, a vehicle position with respect to the first vehicle, and transmitting, by the at least one second vehicle, a response indicating that the adjustment of the vehicle position may be completed to the first vehicle.

The adjusting of the vehicle position may include adjusting, by the at least one second vehicle, the vehicle position in a predetermined order.

The implementing of the sound stage may include determining, by the first vehicle and the at least one second vehicle, a communication protocol and a codec to be used for a connection with the source device and specifying, by the first vehicle and the at least one second vehicle, an AMP output control parameter based on a previously specified speaker role.

The sound stage type may be classified into a surround sound stage, a stereo sound stage, and an individual sound stage.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
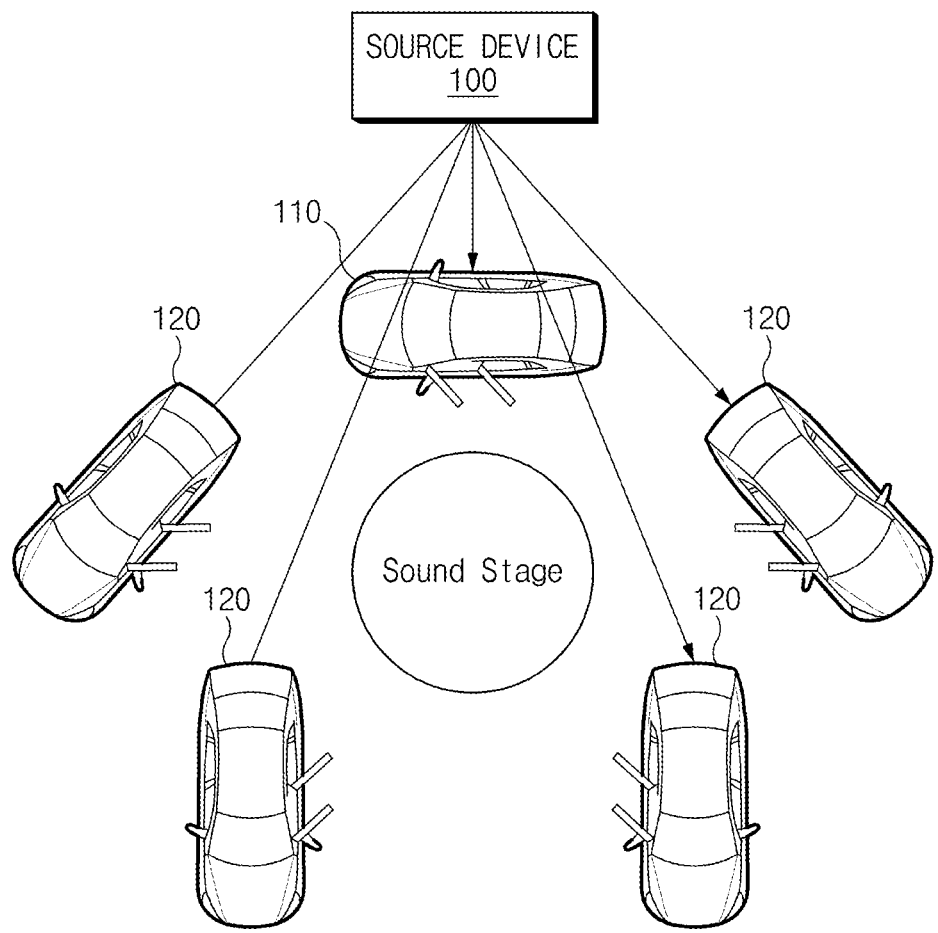
FIG. 1 is a drawing illustrating a configuration of a sound system according to embodiments of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. Fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, rom, ram, compact disc (cd)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a controller area network (can).

Unless specifically stated or obvious from context, as used herein, the term "about" is understood as within a range of normal tolerance in the art, for example within 2 standard deviations of the mean. "about" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms may be only used to distinguish one element from another element, but do not limit the corresponding elements irrespective of the order or priority of the corresponding elements. Furthermore, unless otherwise defined, all terms including technical and scientific terms used herein may be to be interpreted as may be customary in the art to which the present disclosure belongs. Such terms as those defined in a generally used dictionary may be to be interpreted as having meanings equal to the contextual meanings in the relevant field of art, and may not be to be interpreted as having ideal or excessively formal meanings unless clearly defined as having such in the present application.

FIG. 1 is a drawing illustrating a configuration of a sound system according to embodiments of the present disclosure.

The sound system may include a source device 100, a first vehicle 110, and at least one second vehicle 120. In the present embodiment, the case where the five vehicles 110 and 120 may be connected with the one source device 100 to make up a surround sound stage will be described as an example.

The source device 100 may provide sound data (or audio data or media data). The source device 100 may be configured to transmit the sound data using short range wireless communication. A smartphone, a mobile device, a beam projector, or the like may be used as the source device 100.

The first vehicle 110 may be an initiator vehicle, and the at least one second vehicle 120 may be a member vehicle. The first vehicle 110 and the at least one second vehicle 120 may be configured to play a speaker role in the sound system.

The first vehicle 110 and each of the at least one second vehicle 120 may be configured to receive the same sound data from the source device 100. Each of the vehicles 110 and 120 may be configured to set a speaker role to be charged by each, through a pre-connection process. Each of the vehicles 110 and 120 may adjust its vehicle position such that a user may appreciate an optimal sound in a sound stage. After adjusting the vehicle position, each of the vehicles 110 and 120 may be configured to perform a procedure of synchronizing sounds output from the respective vehicles 110 and 120 in the sound stage. After performing a series of processes, each of the vehicles 110 and 120 may be configured to receive sound data transmitted from the source device 100. Each of the vehicles 110 and 120 may separate and output only a sound (or sound data) of the speaker role to be charged by each from the received sound data.

Figure 2:
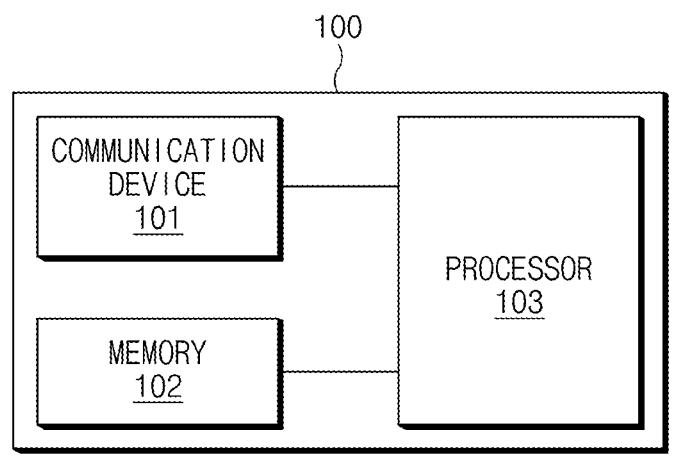
FIG. 2 is a block diagram illustrating a configuration of a source device according to embodiments of the present disclosure.

FIG. 2 is a block diagram illustrating a configuration of a source device according to embodiments of the present disclosure.

Referring to FIG. 2, a source device 100 may include a communication device 101, a memory 102, and a processor 103.

The communication device 101 may be configured to assist the source device 100 to perform short range wireless communication between the source device 100 and a first vehicle 110 of FIG. 1 and between the source device 100 and at least one second vehicle 120 of FIG. 1. The communication device 101 may be configured to use a communication standard for delivering sound data in a broadcasting scheme such as low energy (LE) audio. The communication device 101 may include a communication circuit, an antenna, a transceiver, and/or the like.

The memory 102 may be configured to store sound data, media data, and the like. The memory 102 may be a non-transitory storage medium which stores instructions executed by the processor 103. The memory 102 may be implemented as at least one of a flash memory, a hard disk, a solid state disk (SSD), a secure digital (SD) card, a random access memory (RAM), a static RAM (SRAM), a read only memory (ROM), a programmable ROM (PROM), an electrically erasable and programmable ROM (EEPROM), an erasable and programmable ROM (EPROM), a removable disk, or a combination thereof.

The processor 103 may be configured to control the overall operation of the source device 100. The processor 103 may be implemented as at least one of an application specific integrated circuit (ASIC), a digital signal processor (DSP), a programmable logic device (PLD), a field programmable gate array (FPGA), a central processing unit (CPU), a microcontroller, a microprocessor, or a combination thereof.

The processor 103 may be configured to set a connection between the first vehicle 110 and the at least one second vehicle 120, which may be located around the source device 100, by means of the communication device 101. When the communication connection among the source device 100, the first vehicle 110, and the at least one second vehicle 120 may be completed, the processor 103 may be configured to transmit (or broadcast) the sound data stored in the memory 102 to the first vehicle 110 and the at least one second vehicle 120.

Figure 3:
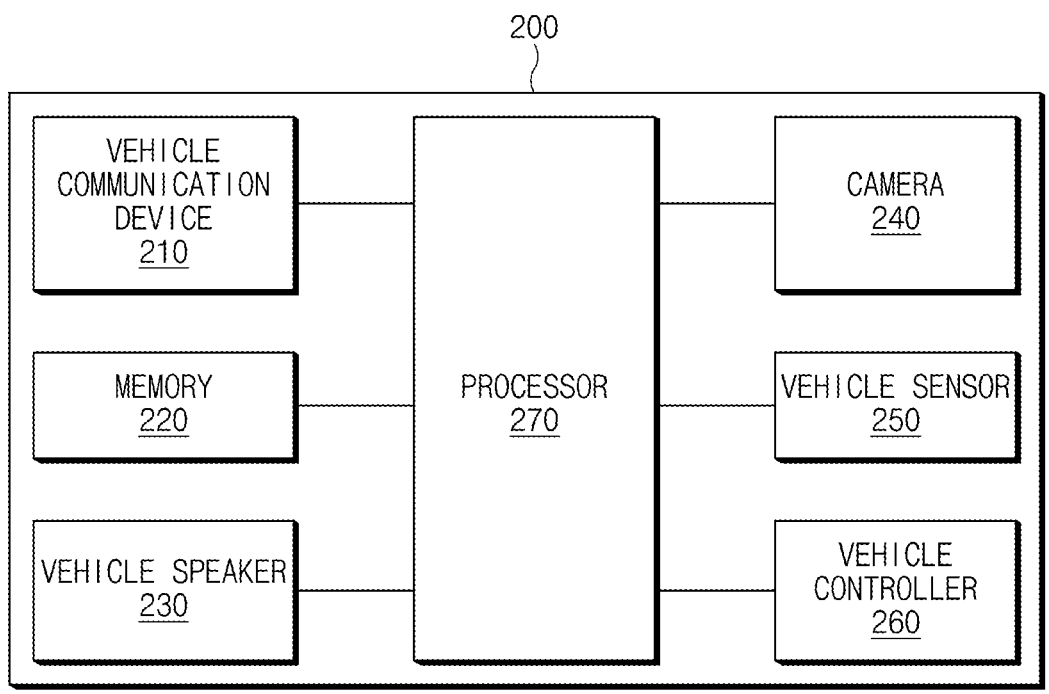
FIG. 3 is a block diagram illustrating a configuration of a vehicle control device according to embodiments of the present disclosure.

FIG. 3 is a block diagram illustrating a configuration of a vehicle control device according to embodiments of the present disclosure.

A vehicle control device 200 may be mounted on each of a first vehicle 110 and at least one second vehicle 120 shown in FIG. 1. Referring to FIG. 3, the vehicle control device 200 may include a vehicle communication device 210, a memory 220, a vehicle speaker 230, a camera 240, a vehicle sensor 250, a vehicle controller 260, and a processor 270.

The vehicle communication device 210 may be configured to assist the vehicle control device 200 to perform short range wireless communication with a source device 100 shown in FIG. 1. The vehicle communication device 210 may be configured to receive sound data transmitted from the source device 100 using a communication standard such as low energy (LE) audio. The vehicle communication device 210 may include a communication processor, a communication circuit, an antenna, a transceiver, and/or the like.

The vehicle communication device 210 may use a communication technology such as short range communication (e.g., Bluetooth, near field communication (NFC), radio frequency identification (RFID), infrared data association (IrDA), or the like), vehicle-to-vehicle (V2V) communication, vehicle-to-nomadic devices (V2N) communication, and/or an in-vehicle network (IVN).

The memory 220 may be a storage medium which stores instructions executed by the processor 270. The memory 220 may be implemented as at least one of a flash memory, a hard disk, an SSD, an SD card, a RAM, an SRAM, a ROM, a PROM, an EEPROM, an EPROM, a removable disk, or a combination thereof.

The memory 220 may include a camera guideline database (DB) for each speaker role, initiator and member system configuration information, connection information for a connection with a source device, an AMP output control parameter, or the like. The initiator and member system configuration information may include speaker role information, a device name and address, a support protocol for each device, stage configuration information, support codec information, AMP configuration information and/or the like. The AMP output control parameter may include a stereo speaker parameter, a surround speaker parameter, an individual sound stage parameter, an audio buffer management parameter, and/or the like. The connection information for the connection with the source device may include specified protocol information, specified codec information, a source device address, and/or the like.

The vehicle speaker 230 may include at least one or more speakers installed at different positions inside and outside the vehicle. The vehicle speaker 230 may output the played sound data to the outside under an instruction of the processor 270.

The camera 240 may be mounted on each of the vehicles 110 and 120 to obtain an image around each of the vehicles 110 and 120. The camera 240 may be installed at a position of at least one of the front, the rear, the left, and the right of each of the vehicles 110 and 120. The camera 240 may include at least one image sensor and at least one lens. Furthermore, the camera 240 may include an image processor for performing image processing, such as noise cancellation, color reproduction, image quality adjustment, and saturation adjustment, for an image obtained by the image sensor.

The vehicle sensor 250 may be configured to obtain vehicle information from at least one sensor and/or at least one electronic control unit (ECU) mounted on each of the vehicles 110 and 120. The at least one sensor may include a steering angle sensor, a wheel speed sensor, a 3-axis accelerometer, an inertial measurement unit (IMU), a radio detecting and ranging (RADAR), a light detection and ranging (LiDAR), and/or the like.

The vehicle controller 260 may be configured to control an actuator to control a behavior (e.g., acceleration, deceleration, shift, steering, braking, or the like) of the vehicle.

The processor 270 may be configured to control the overall operation of each of the vehicles 110 and 120. The processor 270 may be implemented as at least one of an ASIC, a DSP, a PLD, an FPGA, a CPU, a microcontroller, a microprocessor, or a combination thereof.

When a predetermined event is detected, the processor 270 may be configured to switch an operation mode to a sound stage mode. For example, the processor 270 may enter the sound stage mode depending on data input by a user.

The processor 270 may be configured to select and set a vehicle role in a sound system. Herein, the vehicle role may be classified into an initiator and a member.

The processor 270 may be configured to select a sound stage type to be configured. The sound stage type may be divided into a surround sound stage, a stereo sound stage, and an individual sound stage, and the like.

The processor 270 may be configured to generate a vehicle group with surrounding vehicles through the vehicle communication device 210 based on the selected sound stage type. The processor 270 may be configured to select (or define) a speaker role of each vehicle in the vehicle group.

The processor 270 may be configured to align (or adjust) a vehicle position to an optimal position with respect to an initiator vehicle using the camera 240 and the vehicle sensor 250. The processor 270 may adjust a vehicle position in a predetermined order. For example, when the speaker role specified (or defined) in the vehicle may be a rear left (RL) speaker or a rear right (RR) speaker, the processor 270 may be configured to wait until the adjustment of the position of a member vehicle which plays a front left (FL) speaker role or a front right (FR) speaker role may be completed and may adjust the position of the vehicle. At this time, the processor 270 may be configured to identify whether the adjustment of the position of the member vehicle which plays the FL speaker role or the FR speaker role may be completed through communication with the initiator vehicle.

The processor 270 may be configured to identify a speaker role defined in the vehicle and may be configured to prepare to output only a sound source (or sound data) of the speaker role depending on the identified speaker role.

When the vehicle may be an initiator vehicle, the processor 270 may be configured to select the source device 100. The processor 270 may be configured to transmit device information about the selected source device 100 to member vehicles.

The processor 270 may be configured to receive sound data from the source device 100 through the vehicle communication device 210 and may be configured to separate (or extract) sound data corresponding to the speaker role of the vehicle from the received sound data. The processor 270 may be configured to play and output the separated sound data through the vehicle speaker 230.

Figure 4:
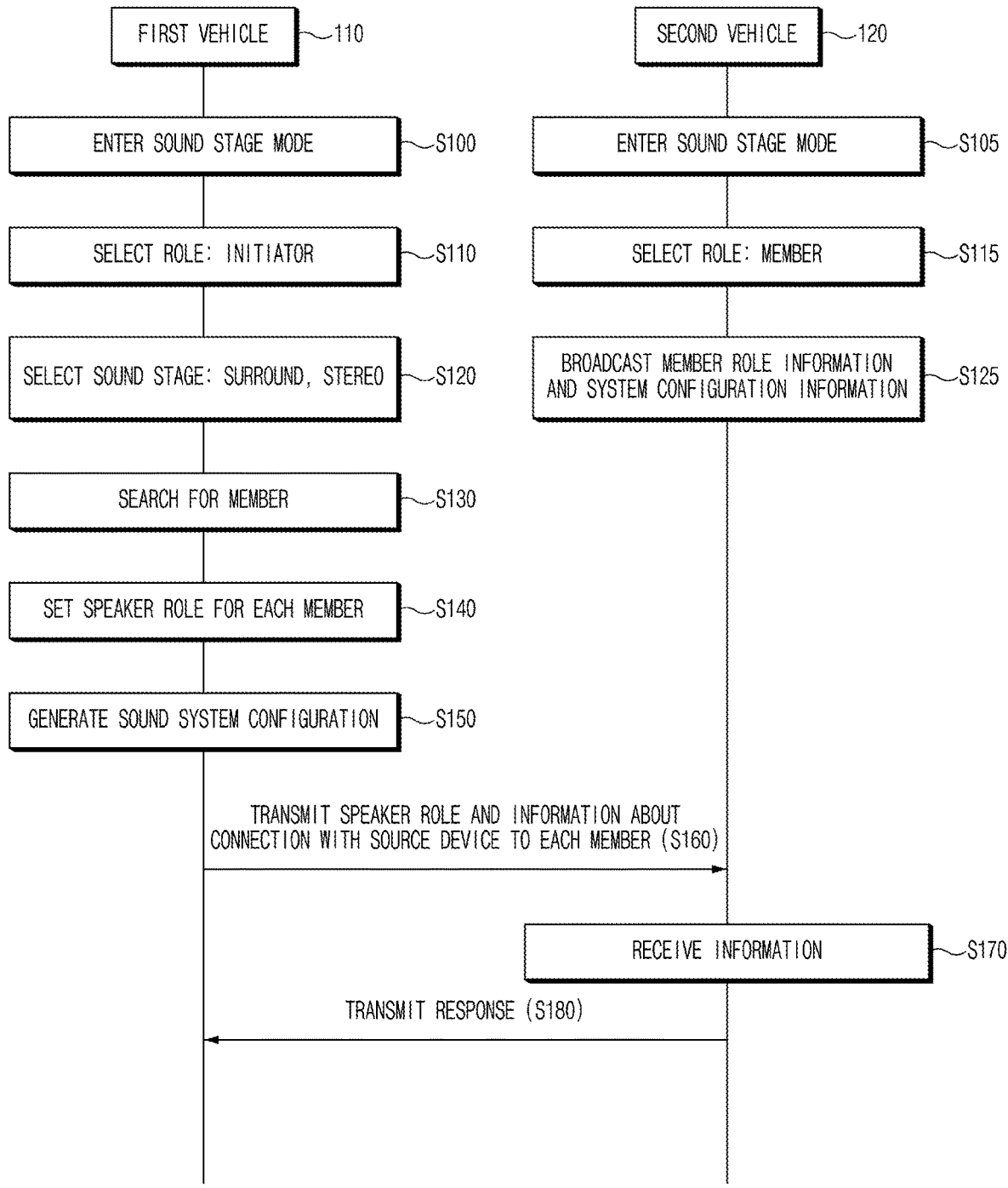
FIG. 4 is a signal sequence diagram illustrating a process of generating a vehicle group according to an embodiment of the present disclosure.

FIG. 4 is a signal sequence diagram illustrating a process of generating a vehicle group according to an embodiment of the present disclosure.

In the present embodiment, a description will be given assuming that a first vehicle 110 may be an initiator and a second vehicle 120 may be a member.

When detecting a predetermined event, in S100, the first vehicle 110 may enter a sound stage mode. For example, when receiving a signal for instructing to enter the sound stage mode from a user interface, the first vehicle 110 may switch its operation mode to the sound stage mode.

In S105, the second vehicle 120 may enter the sound stage mode like the first vehicle 110. The second vehicle 120 may enter the sound stage mode depending on a user input.

The first vehicle 110 and the second vehicle 120 may enter the sound stage mode to start to prepare a connection with a source device 100 of FIG. 1.

In S110, the first vehicle 110 may select its vehicle role in a sound system. The first vehicle 110 may select the vehicle role as an "initiator". The first vehicle 110, the vehicle role of which may be set to the "initiator", may have a speaker role automatically assigned to a center speaker, when a sound stage type is selected as a surround sound stage. Furthermore, when the sound stage type is selected as a stereo sound stage, the first vehicle 110 may have a speaker role automatically assigned to a left (L) speaker (or a first channel speaker).

In S115, the second vehicle 120 may select its vehicle role in the sound system. The second vehicle 120 may select the vehicle role as a "member".

In S120, the first vehicle 110 may select a sound stage to be implemented (or configured). The first vehicle 110 may select the sound stage type as a surround or a stereo based on data received from a user interface.

In S125, the second vehicle 120 may broadcast the selected role information and system configuration information. In other words, the second vehicle 120 may broadcast information indicating that the member role is defined together with the system configuration information. The second vehicle 120 may broadcast system configuration information such as a name, device address information, a role, and an AMP configuration (e.g., a type, a version, a function, or the like).

In S130, the first vehicle 110 may search for a member (e.g., a member vehicle or a sound system of the second vehicle 120) around the first vehicle 110. The first vehicle 110 may search for system configuration information broadcast from the second vehicle 120 and may determine and select a member capable of making up the sound system with the first vehicle 110. The first vehicle 110 may display the selected member on a display screen of audio video navigation telematics (AVNT).

In S140, the first vehicle 110 may select a speaker role for each found member. The first vehicle 110 may select the found member vehicle depending on a user input and may specify a speaker role for each member vehicle.

In S150, the first vehicle 110 may generate a sound system configuration. The first vehicle 110 may generate initiator and member system configuration information.

In S160, the first vehicle 110 may transmit a speaker role and information about a connection with the source device 100 to each member (e.g., the second vehicle 120). The first vehicle 110 may transmit a speaker role of each member and protocol information or a negotiation value required upon the connection with the source device 100 based on device address information (or sound system address information of a member vehicle).

In S170, the second vehicle 120 may receive the information transmitted from the first vehicle 110. The second vehicle 120 may receive and identify information about a speaker role assigned to the second vehicle 120 and connection information for a connection with the source device 100.

In S180, the second vehicle 120 may transmit a response indicating an acknowledgement of the reception of information.

Figure 5:
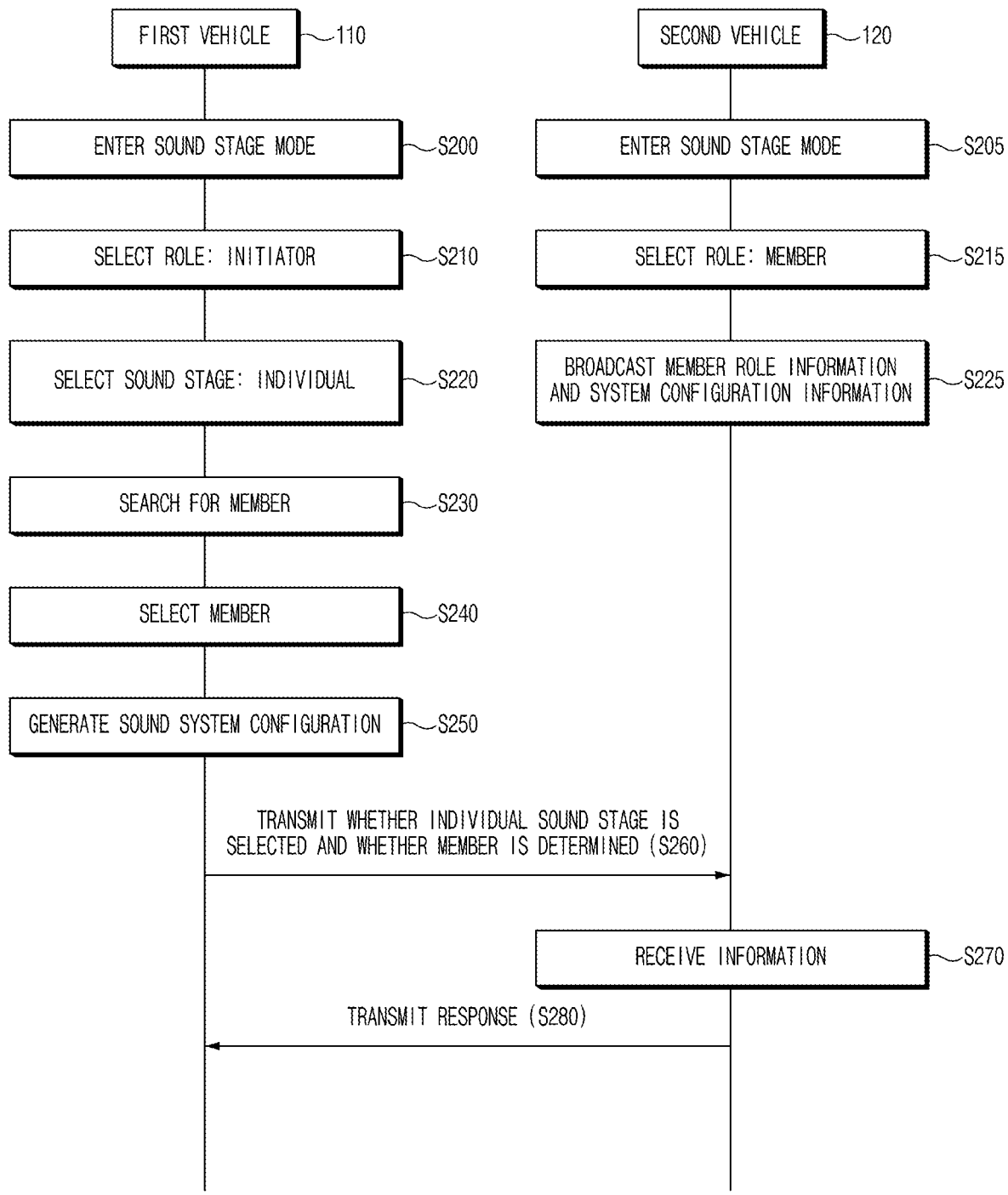
FIG. 5 is a signal sequence diagram illustrating a process of generating a vehicle group according to another embodiment of the present disclosure.

FIG. 5 is a signal sequence diagram illustrating a process of generating a vehicle group according to another embodiment of the present disclosure.

When detecting a predetermined event, in S200, a first vehicle 110 may enter a sound stage mode. For example, when receiving a signal for instructing to enter the sound stage mode from a user interface, the first vehicle 110 may switch its operation mode to the sound stage mode.

In S205, the second vehicle 120 may enter the sound stage mode depending on a user input received from the user interface.

In S210, the first vehicle 110 may select its vehicle role in a sound system. The first vehicle 110 may select the vehicle role as an "initiator". The first vehicle 110, the vehicle role of which may be set to the "initiator", may have a speaker role automatically assigned to a center speaker, when a sound stage type may be selected as a surround sound stage. Furthermore, when the sound stage type may be selected as a stereo sound stage, the first vehicle 110 may have a speaker role automatically assigned to a left (L) speaker.

In S215, the second vehicle 120 may select its vehicle role in the sound system. The second vehicle 120 may set the vehicle role to a "member".

In S220, the first vehicle 110 may select a sound stage to be implemented (configured). The first vehicle 110 may determine the sound stage type as an individual sound stage.

In S225, the second vehicle 120 may broadcast information about the selected role and system configuration information. In other words, the second vehicle 120 may broadcast information indicating that the member role is defined together with the system configuration information. The second vehicle 120 may broadcast system configuration information such as a name, device address information, a role, and an AMP configuration (e.g., a type, a version, a function, or the like).

In S230, the first vehicle 110 may search for a member (or a member candidate vehicle) around the first vehicle 110. The first vehicle 110 may search for the system configuration information broadcast from the second vehicle 120 and may determine and select a member capable of making up the sound system with the first vehicle 110. The first vehicle 110 may display the selected member on a display screen of AVNT.

In S240, the first vehicle 110 may select (or determine) a final member among the found members.

In S250, the first vehicle 110 may generate a sound system configuration. The first vehicle 110 may generate initiator and member system configuration information.

In S260, the first vehicle 110 may transmit whether an individual sound stage may be selected and whether a member may be determined to the second vehicle 120. The first vehicle 110 may deliver information indicating that the individual sound stage may be selected and whether the member may be determined to each member based on device address information.

In S270, the second vehicle 120 may receive the information transmitted from the first vehicle 110. The second vehicle 120 may receive information indicating that the individual sound stage is selected and that the member is determined. At this time, the second vehicle 120 may receive connection information for a connection with a source device 100 of FIG. 1 from the first vehicle 110.

In S280, the second vehicle 120 may transmit a response indicating an acknowledgement of the reception of information. In other words, the second vehicle 120 may transmit a response message for notifying the first vehicle 110 that the acknowledgement of the received information is completed.

In the above-mentioned embodiment, when the individual sound stage is selected, the first vehicle 110 may fail to separately deliver information except for whether the member is made up because of using a configuration or a protocol of an AMP supported by each vehicle.

Figure 6:
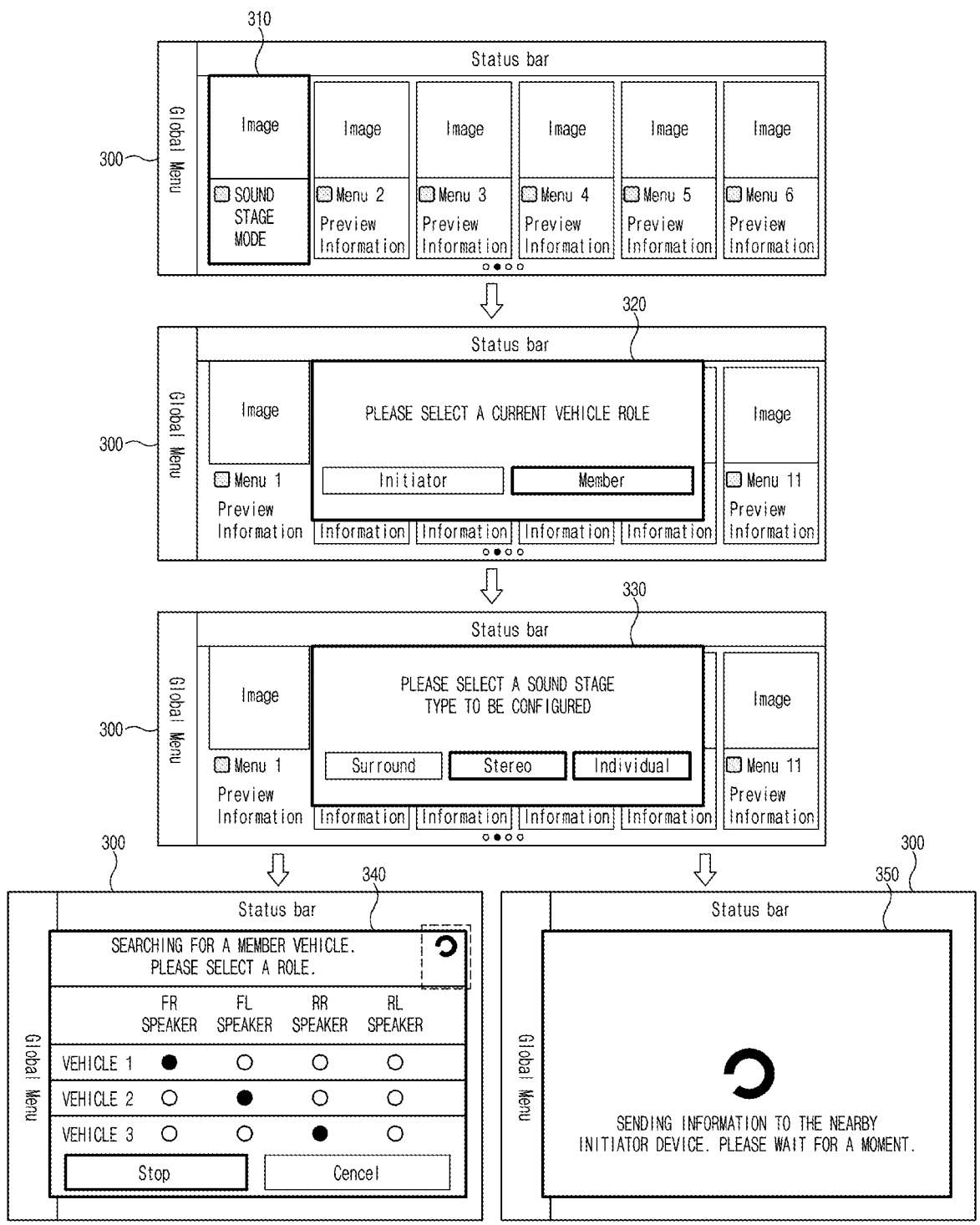
FIG. 6 is a drawing illustrating a process of generating a vehicle group according to embodiments of the present disclosure.

FIG. 6 is a drawing illustrating a process of generating a vehicle group according to embodiments of the present disclosure.

A vehicle control apparatus 200 of a vehicle may display a menu screen on a display 300. When a "sound stage mode" menu 310 may be selected on the menu screen displayed on the display 300, the vehicle control device 200 may output a pop-up window 320 for selecting a current vehicle role. The vehicle control device 200 may select an "initiator" or a "member" on the pop-up window 320 for selecting a vehicle role depending on a user input. When the vehicle role may be selected, the vehicle control device 200 may display a pop-up window 330 for selecting a sound stage type to be made up.

When the sound stage type may be selected on the pop-up window 330, the vehicle control device 200 of an initiator vehicle may output a pop-up window 340 capable of selecting a speaker role of a member vehicle by means of the display 300.

Furthermore, the vehicle control device 200 of the member vehicle may transmit system configuration information of the member vehicle to the initiator vehicle. At this time, the vehicle control device 200 of the member vehicle may output a pop-up window 350 indicating that the system configuration information may be being transmitted to the initiator vehicle.

Figure 7:
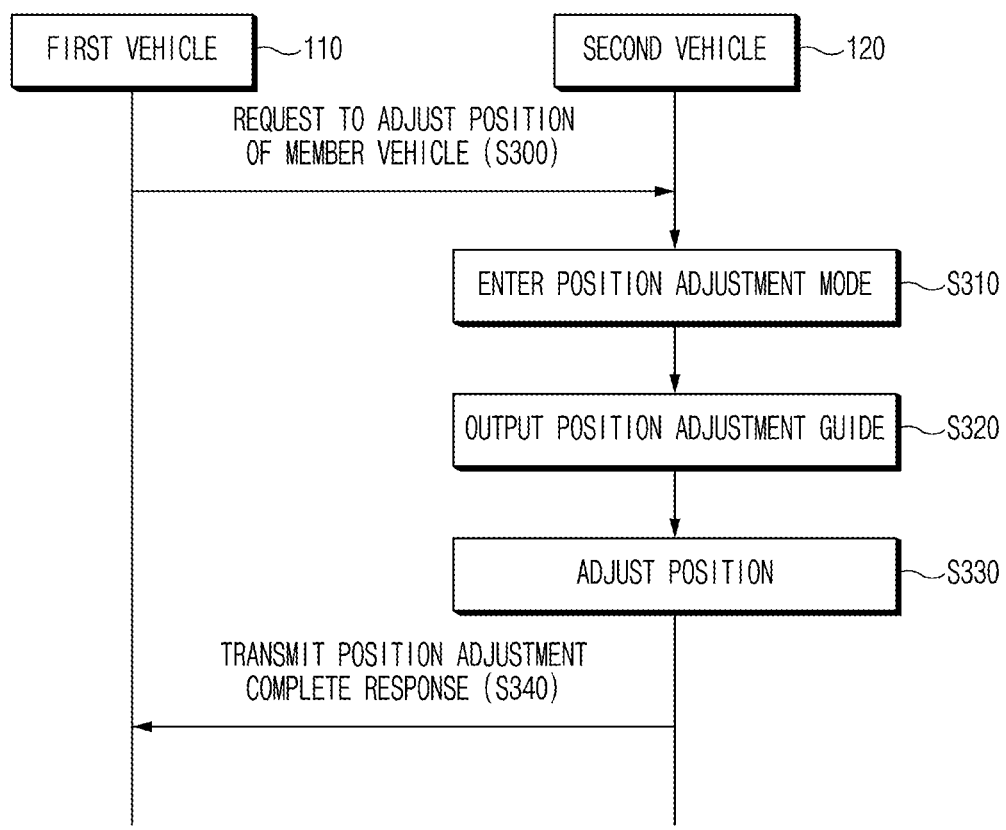
FIG. 7 is a signal sequence diagram schematically illustrating a process of adjusting a position of a vehicle according to embodiments of the present disclosure.
Figure 8:
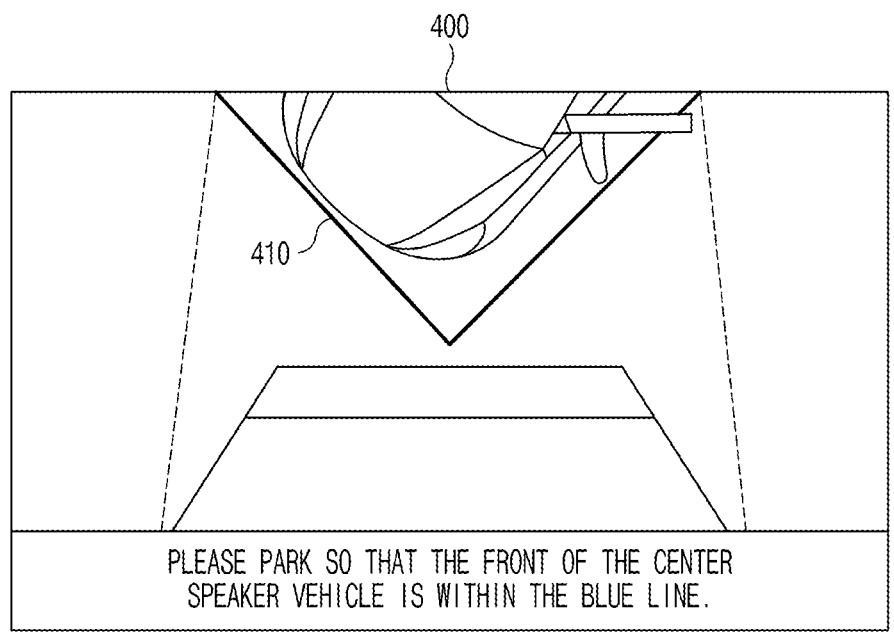
FIG. 8 is a drawing illustrating an example of providing a vehicle alignment guideline according to embodiments of the present disclosure.

FIG. 7 is a signal sequence diagram schematically illustrating a process of adjusting a position of a vehicle according to embodiments of the present disclosure. FIG. 8 is a drawing illustrating an example of providing a vehicle alignment guideline according to embodiments of the present disclosure.

In the present embodiment, a description will be given of a process of adjusting a vehicle position on the assumption that a first vehicle 110 may be an initiator vehicle (or a center speaker or a reference vehicle) and that a second vehicle 120 may be a member vehicle.

In S300, the first vehicle 110 may transmit a request to adjust a position of the member vehicle to the second vehicle 120.

When receiving the position adjust request from the first vehicle 110, in S310, the second vehicle 120 may enter a position adjustment mode.

In S320, the second vehicle 120 may output a position adjustment guide. As shown in FIG. 8, the second vehicle 120 may display a guideline 410 for adjusting (or aligning) a vehicle position with respect to the first vehicle 110 on a camera mode screen 400 displayed on a display.

In S330, the second vehicle 120 may adjust a vehicle position based on the output position adjustment guide.

When the adjustment of the position is completed, in S340, the second vehicle 120 may transmit a response indicating that the adjustment of the position is completed to the first vehicle 110.

Figure 9:
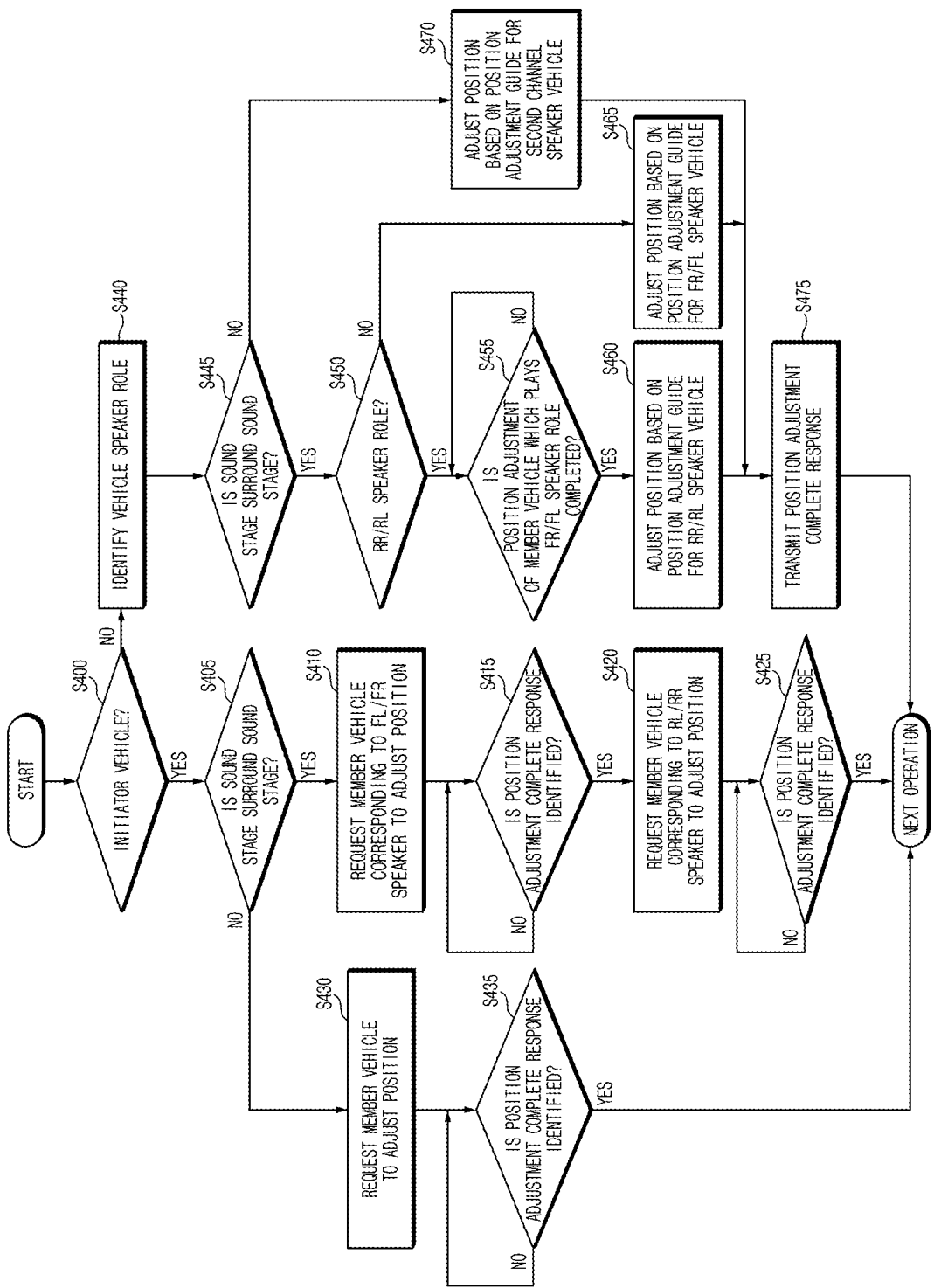
FIG. 9 is a flowchart illustrating a process of adjust a position of a vehicle according to embodiments of the present disclosure.

FIG. 9 is a flowchart illustrating a process of adjust a position of a vehicle according to embodiments of the present disclosure.

In S400, a vehicle control device 200 of FIG. 3 may determine whether a vehicle role in a sound system is an initiator vehicle. In other words, the vehicle control device 200 may identify whether the vehicle is an initiator vehicle or a member vehicle.

When it is identified that the vehicle role is the initiator vehicle, in S405, the vehicle control device 200 may identify whether a sound stage is a surround sound stage. The vehicle control device 200 may identify whether a sound stage to be implemented is a surround sound stage or a stereo sound stage.

When it is identified that the sound stage is the surround sound stage, in S410, the vehicle control device 200 may request a member vehicle, which plays a front left (FL) and front right (FR) speaker role, to adjust a position.

In S415, the vehicle control device 200 may identify whether a position adjustment complete response is received from the member vehicle which plays the FL and FR speaker role.

When the position adjustment complete response is received, in S420, the vehicle control device 200 may transmit a position adjustment request to a member vehicle which plays a rear left (RL) and a rear right (RR) speaker role.

In S425, the vehicle control device 200 may identify whether a position adjustment complete response is received from the member vehicle which plays the RL and RR speaker role.

When it is identified that the sound stage is not the surround sound stage in S405, in S430, the vehicle control device 200 may request the member vehicle to adjust a position. At this time, the initiator vehicle may play a first channel speaker (or an L speaker) role, and the member vehicle may play a second channel speaker (or an R speaker) role.

In S435, the vehicle control device 200 may identify whether a position adjustment complete response is received from the member vehicle.

When the position adjustment complete response is received in S425 or S435, the vehicle control device 200 may perform a next operation.

When it is determined that the vehicle role is not the initiator vehicle, that is, when it is determined that the vehicle role is the member vehicle, in S440, the vehicle control device 200 may identify a vehicle speaker role.

In S445, the vehicle control device 200 may identify whether the sound stage is a surround sound stage.

When the sound stage is the surround sound stage, in S450, the vehicle control device 200 may identify whether the vehicle speaker role is an RL and RR speaker role.

When the vehicle speaker role is the RL and RR speaker role, in S455, the vehicle control device 200 may identify whether the position adjustment of the member vehicle which plays the FL and RF speaker role is completed.

When the position adjustment of the member vehicle which plays the FL and RF speaker role is completed, in S460, the vehicle control device 200 may adjust a vehicle position based on a position adjustment guide for RL and RR speaker vehicle. The vehicle control device 200 may fetch (or read out) a position adjustment guide for RL and RR speaker vehicle from a camera guideline DB for each speaker role, which is stored in a memory 220 of FIG. 3. The vehicle control device 200 may output the fetched position adjustment guide for RL and RR speaker vehicle through a display screen.

When the vehicle speaker role is not the RL and RR speaker role in S450, in S465, the vehicle control device 200 may adjust a vehicle position based on the position adjustment guide for FL and FR speaker vehicle, which is fetched from the camera guideline DB for each speaker role.

When the sound stage is not the surround sound stage in S445, in S470, the vehicle control device 200 may adjust a vehicle position based on the position adjustment guide for second channel speaker vehicle, which is fetched from the camera guideline DB for each speaker role.

When the position adjustment of the member vehicle is completed, in S475, the vehicle control device 200 may transmit a position adjustment complete response to the initiator vehicle.

Figure 10:
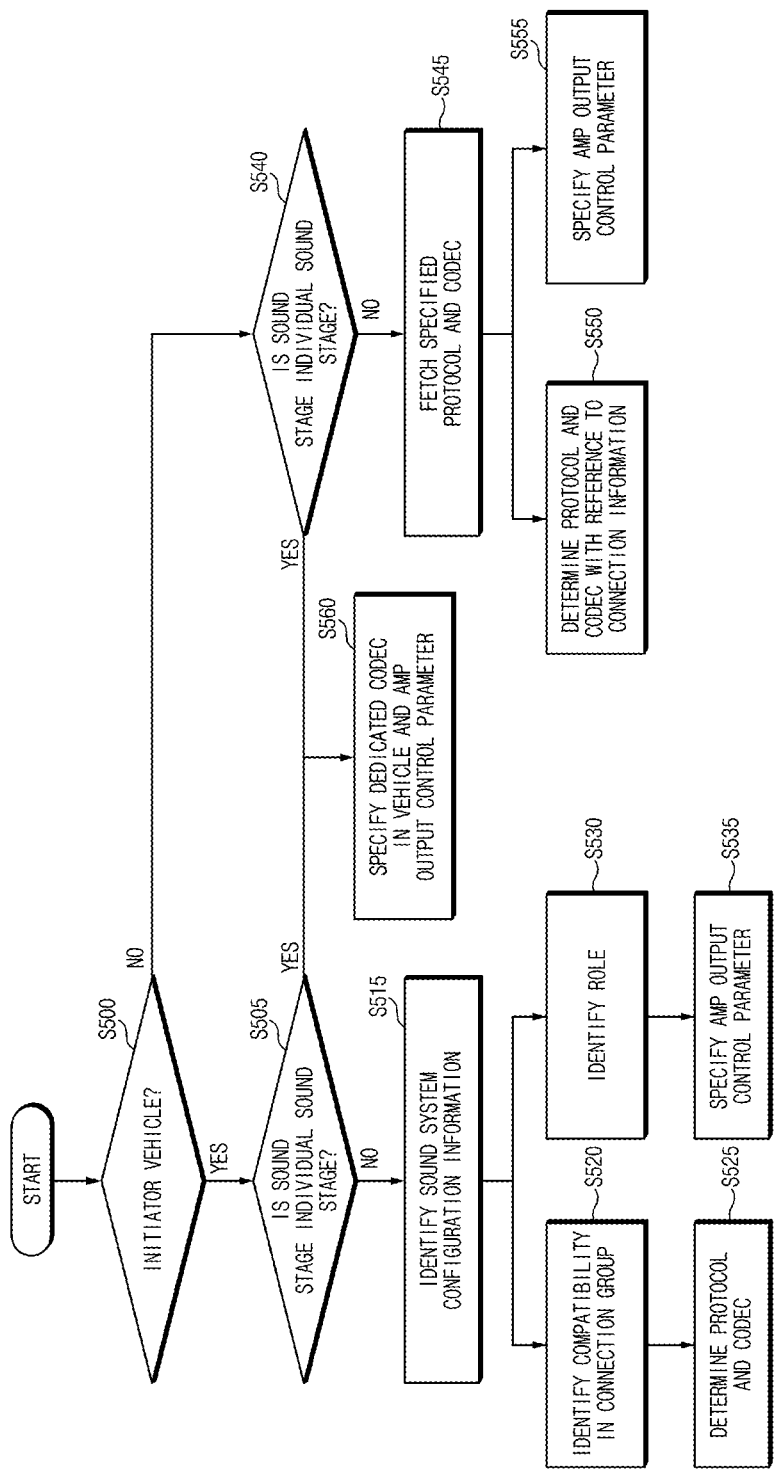
FIG. 10 is a flowchart illustrating a process of controlling a sound source according to embodiments of the present disclosure.

FIG. 10 is a flowchart illustrating a process of controlling a sound source according to embodiments of the present disclosure.

In S500, a vehicle control device 200 of FIG. 3 may determine whether a vehicle role in a sound system is an initiator vehicle. The vehicle control device 200 may identify whether the vehicle is an initiator vehicle or a member vehicle.

When it is determined that the vehicle role is the initiator vehicle, in S505, the vehicle control device 200 may identify whether a sound stage is an individual sound stage. The vehicle control device 200 may identify whether a sound stage to be implemented is a surround sound stage, a stereo sound stage, or the individual sound stage.

When the sound stage is not the individual sound stage, in S515, the vehicle control device 200 may identify sound system configuration information. When the sound stage to be implemented is the surround sound stage or the stereo sound stage, the vehicle control device 200 may identify an initiator and member system configuration feature from initiator and member system configuration information stored in a memory 220 of FIG. 3.

In S520, the vehicle control device 200 may identify compatibility in a connection group. The vehicle control device 200 may identify connection backward compatibility in a group, with reference to the sound system configuration information stored in the memory 220.

In S525, the vehicle control device 200 may determine a protocol and a codec to be used by the entire group.

In S530, the vehicle control device 200 may identify a speaker role of the vehicle.

In S535, the vehicle control device 200 may specify an AMP output control parameter according to the speaker role. The vehicle control device 200 may specify a predetermined AMP output control parameter based on a specified speaker role.

When the vehicle role is not the initiator vehicle in S500, in S540, the vehicle control device 200 may identify whether the sound stage is an individual sound stage. When the vehicle is a member vehicle, the vehicle control device 200 may identify whether a sound stage to be implemented is an individual sound stage.

When the sound stage to be implemented is not the individual sound stage, in S545, the vehicle control device 200 may identify a specified protocol and codec. The vehicle control apparatus 200 may determine a communication protocol and a codec optimized for the vehicle.

In S550, the vehicle control device 200 may determine a protocol and a codec with reference to connection information (or source device connection information) for a connection with a source device 100 of FIG. 1.

In S555, the vehicle control device 200 may specify a predetermined AMP output control parameter.

Figure 11:
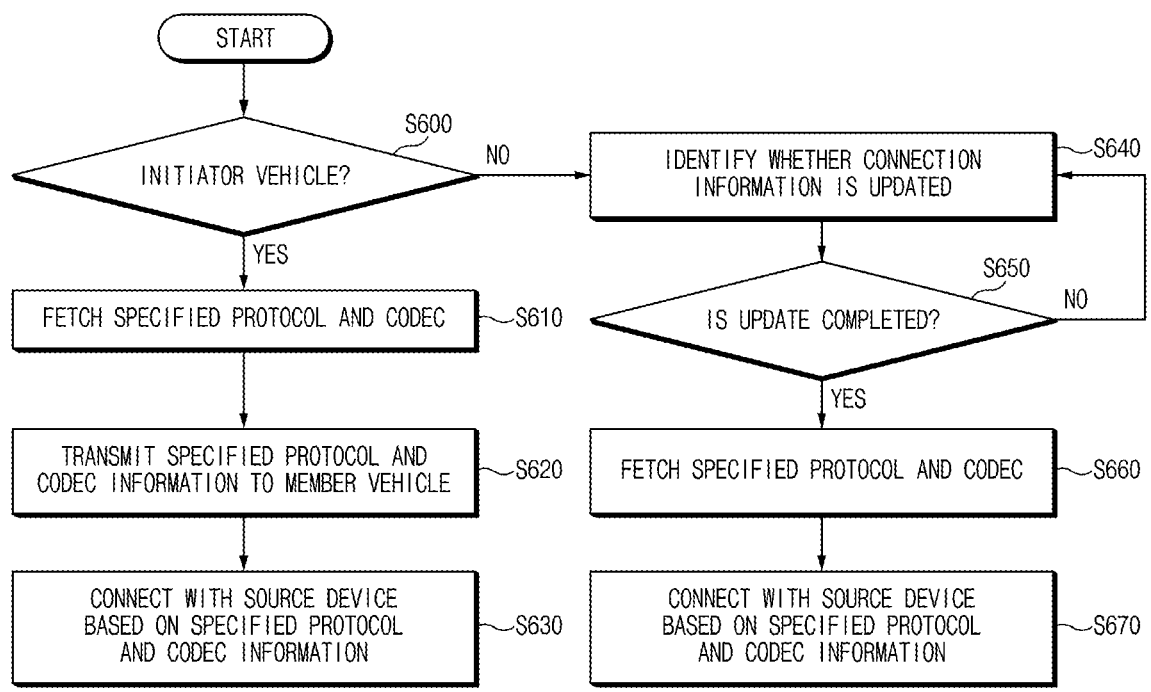
FIG. 11 is a flowchart illustrating a process of connecting a source device according to embodiments of the present disclosure.

When it is identified that the sound stage is the individual sound stage in S505 or S540, in S560, the vehicle control device 200 may specify a dedicated codec in the vehicle and an AMP output control parameter FIG. 11 is a flowchart illustrating a process of connecting a source device according to embodiments of the present disclosure.

In S600, a vehicle control device 200 of FIG. 3 may determine whether a vehicle role in a sound system is an initiator vehicle. The vehicle control device 200 may identify whether the vehicle is an initiator vehicle or a member vehicle.

When it is determined that the vehicle role is the initiator vehicle, in S610, the vehicle control device 200 may fetch a specified protocol and code. The vehicle control device 200 may extract information about the specified protocol and codec from connection information (or source device connection information) for a connection with a source device 100 of FIG. 1, which is stored in a memory 220 of FIG. 3.

In S620, the vehicle control device 200 may transmit the specified protocol and codec information to a member vehicle. The vehicle control device 200 may transmit the extracted protocol and codec information through a vehicle communication device 210 of FIG. 3.

In S630, the vehicle control device 200 may perform a connection with the source device 100 based on the specified protocol and codec information.

When the vehicle role is not the initiator vehicle, in S640, the vehicle control device 200 may identify whether the connection information is updated. When it is identified that the vehicle role is a member, the vehicle control device 200 may identify whether the source device connection information is updated.

In S650, the vehicle control device 200 may identify whether the update of the source device connection information is completed.

When the update of the source device connection information is completed, in S660, the vehicle control device 200 may fetch the specified protocol and code. The vehicle control device 200 may identify information about the specified protocol and codec from the source device connection information.

In S670, the vehicle control device 200 may perform a connection with a source device based on the specified protocol and codec information.

Figure 12:
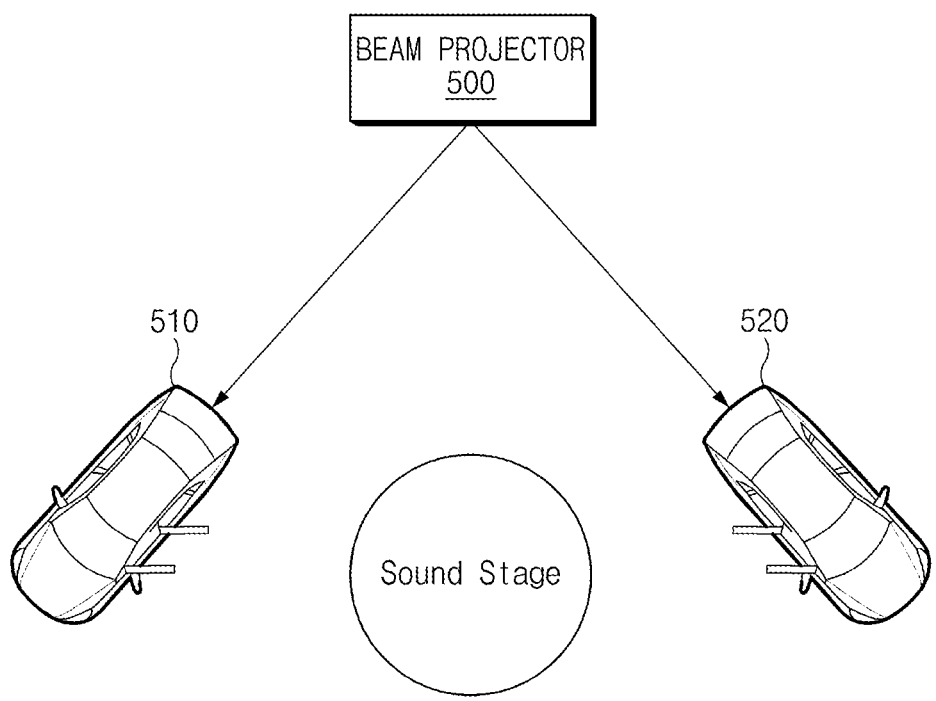
FIGS. 12, 13, and 14 are drawings illustrating examples of implementing sound stages according to embodiments of the present disclosure.
Figure 13:
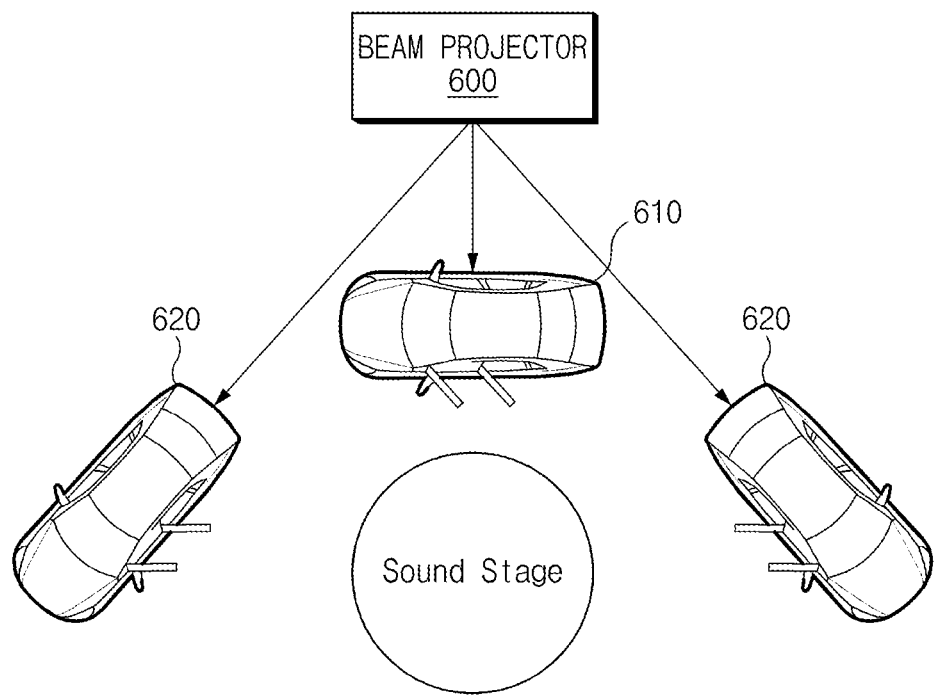
Figure 14:
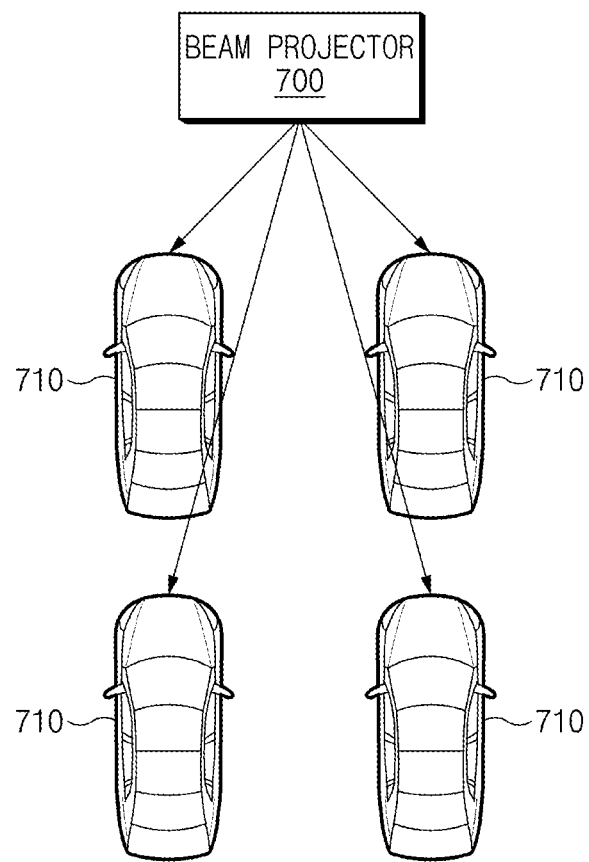

FIGS. 12 to 14 are drawings illustrating examples of implementing sound stages according to embodiments of the present disclosure.

A beam projector may connect vehicles in a group set by a user to allow the user to watch a movie or the like based on a set channel in an external space (e.g., a campground or the like).

Referring to FIG. 12, two vehicles 510 and 520 may be connected with a beam projector 500 to implement a stereo sound stage. The beam projector 500 may be a sound source, which may transmit sound data. The first vehicle 510 and the second vehicle 520 may receive the same sound data transmitted from the beam projector 500 and may play and output the received sound data. At this time, the first vehicle 510 may play an L speaker role, and the second vehicle 520 may play an R speaker role.

Referring to FIG. 13, three vehicles 610, and 620 may be connected with a beam projector 600 to implement a 2.1 channel stereo sound stage. At this time, the first vehicle 610 may play a center speaker role, and the two second vehicles 620 may play an L speaker role and an R speaker role, respectively.

Referring to FIG. 14, a beam projector 700 may be separately connected with grouped vehicles 710 to allow a user to watch a movie in each vehicle. Each vehicle 710 may independently play and output sound data transmitted from the beam projector 700.

Embodiments of the present disclosure may connect vehicle sound systems with a sound source to implement a sound stage in an external space, thus expanding a sound stage a limited number of people may enjoy by means of a vehicle sound system in the vehicle to change to a sound stage a plurality of people may enjoy.

Furthermore, embodiments of the present disclosure may use a vehicle as one speaker device to implement (or make up) an outdoor surround small theater, an outdoor stereo small theater, or a grouped car theater depending on a user selection.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A sound system, comprising:
   a source device configured to provide sound data; and
   a first vehicle and at least one second vehicle connected with the source device through short range wireless communication,
   wherein the first vehicle is configured to:
   enter a sound stage mode;
   search for the at least one second vehicle based on a predetermined sound stage type;
   specify a speaker role of each of the at least one second vehicle;
   transmit the specified speaker role and source device connection information to the at least one second vehicle; and
   connect the first vehicle and the at least one second vehicle with the source device based on the specified speaker role and the source device connection information to implement a sound stage.

2. The sound system of claim 1, wherein the short range wireless communication is low energy (LE) audio.

3. The sound system of claim 1, wherein the at least one second vehicle is configured to enter the sound stage mode and transmit predetermined role information and system configuration information to the first vehicle.

4. The sound system of claim 1, wherein the first vehicle is configured to:
   transmit a position adjustment request to the at least one second vehicle; and wait until a response indicating that adjustment of a vehicle position is completed is received from the at least one second vehicle.

5. The sound system of claim 4, wherein the at least one second vehicle is configured to:
adjust a vehicle position with respect to the first vehicle; and
transmit the response indicating that the adjustment of the vehicle position is completed to the first vehicle.

6. The sound system of claim 5, wherein the at least one second vehicle is configured to adjust the vehicle position in a predetermined order.

7. The sound system of claim 1, wherein the first vehicle and the at least one second vehicle are configured to:
determine a communication protocol and a codec to be used for a connection with the source device;
and specify an output control parameter based on a previously specified speaker role.

8. The sound system of claim 1, wherein the sound stage type is classified into a surround sound stage, a stereo sound stage, and an individual sound stage.

9. A method for implementing a sound stage in a sound system including a source device, a first vehicle, and at least one second vehicle connected using short range wireless communication, the method comprising:
entering, by the first vehicle and the at least one second vehicle, a sound stage mode;
searching, by the first vehicle, for the at least one second vehicle based on a predetermined sound stage;
specifying, by the first vehicle, a speaker role of each of the at least one second vehicle;
transmitting, by the first vehicle, the specified speaker role and source device connection information to the at least one second vehicle; and
being connected, by the first vehicle and the at least one second vehicle, with the source device based on the specified speaker role and the source device connection information to implement a sound stage.

10. The method of claim 9, wherein the short range wireless communication is low energy (LE) audio.

11. The method of claim 9, wherein the entering of the sound stage mode includes:
transmitting, by the at least one second vehicle, predetermined role information and system configuration information to the first vehicle.

12. The method of claim 9, wherein the implementing of the sound stage includes:
transmitting, by the first vehicle, a position adjustment request to the at least one second vehicle;
adjusting, by the at least one second vehicle, a vehicle position with respect to the first vehicle; and
transmitting, by the at least one second vehicle, a response indicating that the adjustment of the vehicle position is completed to the first vehicle.

13. The method of claim 12, wherein the adjusting of the vehicle position includes:
adjusting, by the at least one second vehicle, the vehicle position in a predetermined order.

14. The method of claim 9, wherein the implementing of the sound stage includes:
determining, by the first vehicle and the at least one second vehicle, a communication protocol and a codec to be used for a connection with the source device; and
specifying, by the first vehicle and the at least one second vehicle, an output control parameter based on a previously specified speaker role.

15. The method of claim 9, wherein the sound stage type is classified into a surround sound stage, a stereo sound stage, and an individual sound stage.

* * * * *